(12) United States Patent
Ong et al.

(10) Patent No.: US 11,707,891 B2
(45) Date of Patent: *Jul. 25, 2023

(54) METHOD FOR REGULATING TEMPERATURE AT A RESIN INTERFACE IN AN ADDITIVE MANUFACTURING PROCESS

(71) Applicant: Stratasys, Inc., Eden Prairie, MN (US)

(72) Inventors: Joel Ong, San Francisco, CA (US); Christopher Prucha, San Francisco, CA (US); Stephanie Benight, San Francisco, CA (US); Bill Buel, San Francisco, CA (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,685

(22) Filed: Oct. 13, 2022

(65) Prior Publication Data

US 2023/0034915 A1 Feb. 2, 2023

Related U.S. Application Data

(63) Continuation of application No. 17/066,249, filed on Oct. 8, 2020, now Pat. No. 11,498,279, which is a (Continued)

(51) Int. Cl.
*B29C 64/124* (2017.01)
*B29C 64/295* (2017.01)
(Continued)

(52) U.S. Cl.
CPC .......... *B29C 64/364* (2017.08); *B29C 64/124* (2017.08); *B29C 64/129* (2017.08); (Continued)

(58) Field of Classification Search
CPC ..... B33Y 10/00; B33Y 30/00; B29C 37/0075; B29C 64/124; B29C 64/232;
(Continued)

(56) References Cited

U.S. PATENT DOCUMENTS 9,205,601 B2 * 12/2015 DeSimone ............ G03F 7/0037
9,738,034 B2 * 8/2017 Gruber .................... B29C 64/40
(Continued)

FOREIGN PATENT DOCUMENTS

WO 2018006029 A1 1/2018
WO WO-2019204258 A1 * 10/2019 ........... B29C 64/124

OTHER PUBLICATIONS

ESSR received in EP App. No. 19879943.9 dated Jul. 18, 2022.

*Primary Examiner* — Atul P. Khare
(74) *Attorney, Agent, or Firm* — Run8 Patent Group, LLC; Peter Miller

(57) ABSTRACT

A method for additive manufacturing includes: at a build tray arranged over a build window and containing a resin reservoir of a resin, heating the resin reservoir toward a target bulk resin temperature less than a heat deflection temperature of the resin in a photocured state; at a resin interface between a surface of the build window and the resin reservoir, heating an interface layer of the resin reservoir toward a target reaction temperature; and, in response to the resin reservoir exhibiting a first temperature proximal the target bulk resin temperature and to the interface layer exhibiting a second temperature proximal the target reaction temperature: at the resin interface, selectively photocuring a first volume of the resin to form a first layer of a build adhered to a build platform; and retracting the build platform away from the build window.

20 Claims, 5 Drawing Sheets

Related U.S. Application Data continuation of application No. 16/852,078, filed on Apr. 17, 2020, now Pat. No. 10,843,411.

(60) Provisional application No. 62/835,444, filed on Apr. 17, 2019.

(51) Int. Cl.

| | | |
|---|---|---|
| *B29C 64/364* | (2017.01) | |
| *B29C 64/393* | (2017.01) | |
| *B29C 64/135* | (2017.01) | |
| *B33Y 50/02* | (2015.01) | |
| *B33Y 10/00* | (2015.01) | |
| *B29C 64/255* | (2017.01) | |
| *B29C 64/232* | (2017.01) | |
| *B29C 64/129* | (2017.01) | |
| *B33Y 40/00* | (2020.01) | |
| *B33Y 30/00* | (2015.01) | |

(52) U.S. Cl.
CPC .......... *B29C 64/135* (2017.08); *B29C 64/232* (2017.08); *B29C 64/255* (2017.08); *B29C 64/295* (2017.08); *B29C 64/393* (2017.08); *B33Y 10/00* (2014.12); *B33Y 40/00* (2014.12); *B33Y 50/02* (2014.12); *B33Y 30/00* (2014.12); *G05B 2219/49013* (2013.01)

(58) Field of Classification Search
CPC ... B29C 64/245; B29C 64/129; B29C 64/135; B29C 64/295; B29C 64/364; B29C 64/393

See application file for complete search history.

(56) References Cited

U.S. PATENT DOCUMENTS

| | | | |
|---|---|---|---|
| 2016/0303795 A1 | 10/2016 | Liu et al. | |
| 2017/0050389 A1* | 2/2017 | Lee | B33Y 40/00 |
| 2017/0057174 A1* | 3/2017 | Megretski | B29C 64/386 |
| 2017/0239885 A1* | 8/2017 | Knecht | B29C 64/218 |
| 2017/0297261 A1 | 10/2017 | Schultheiss et al. | |
| 2018/0029296 A1* | 2/2018 | Van Esbroeck | B29C 64/286 |
| 2018/0200948 A1* | 7/2018 | Kuijpers | B29C 64/364 |
| 2018/0272606 A1* | 9/2018 | Chang | B29C 35/0888 |
| 2018/0290373 A1* | 10/2018 | El-Siblani | G03F 7/0037 |
| 2019/0111622 A1* | 4/2019 | Khalip | B29C 64/268 |
| 2019/0134887 A1* | 5/2019 | Vadder | B29C 64/295 |
| 2019/0202112 A1* | 7/2019 | Gmeiner | B29C 64/393 |
| 2019/0275740 A1* | 9/2019 | Chang | B29C 64/20 |
| 2019/0311822 A1* | 10/2019 | Perigo | B29C 64/241 |
| 2019/0351609 A1* | 11/2019 | Thau | B29C 64/268 |
| 2020/0001525 A1* | 1/2020 | Wynne | B29C 64/20 |
| 2020/0031045 A1* | 1/2020 | Thompson | B33Y 50/02 |

* cited by examiner

METHOD FOR REGULATING TEMPERATURE AT A RESIN INTERFACE IN AN ADDITIVE MANUFACTURING PROCESS

CROSS REFERENCE TO RELATED APPLICATIONS

This application is a continuation application of U.S. patent application Ser. No. 17/066,249, filed on 8 Oct. 2020, which is a continuation application of U.S. patent application Ser. No. 16/852,078, filed on 17 Apr. 2020, which claims the benefit of U.S. Provisional Application No. 62/835,444, filed on 17 Apr. 2019, both of which are incorporated in their entireties by this reference.

TECHNICAL FIELD

This invention relates generally to the field of additive manufacturing and more specifically to a new and useful method for regulating temperature at a resin interface in an additive manufacturing process in the field of additive manufacturing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
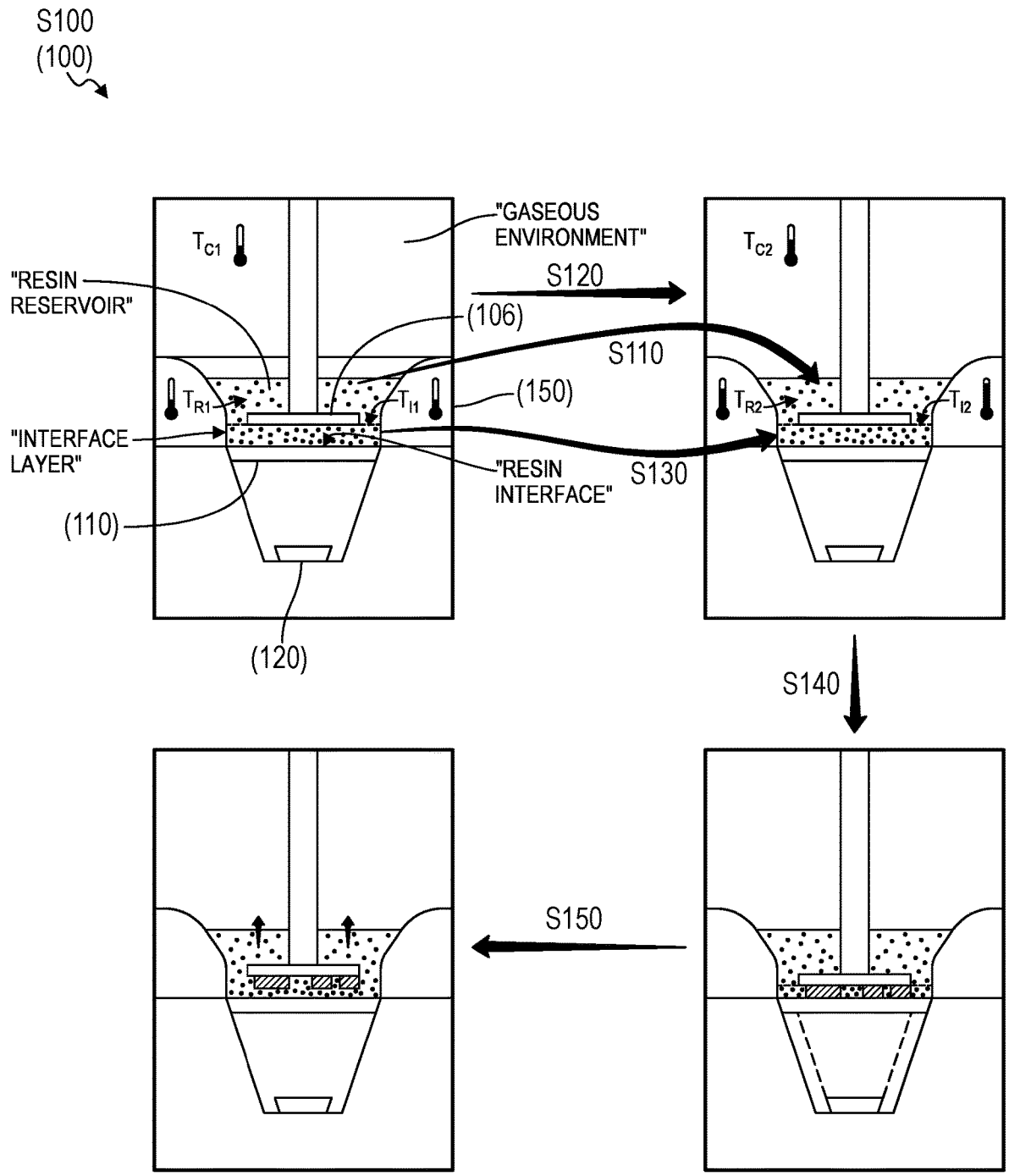
FIG. 1 is a flowchart representation of a method.

As shown in FIG. 1, a method S100 for additive manufacturing includes: at a build tray arranged over a build window and containing a resin reservoir of a resin, heating the resin reservoir toward a target bulk resin temperature less than a heat deflection temperature of the resin in a photocured state, the target bulk resin temperature corresponding toward a target viscosity of the resin in a liquid state in Block Silo; at the build chamber containing a gaseous environment and encompassing the build tray and the build window, heating the gaseous environment toward a target chamber temperature less than a heat deflection temperature of the resin in the photocured state in Block S120; and, at a resin interface between a surface of the build window and the resin reservoir, heating an interface layer of the resin reservoir toward a target reaction temperature, the target reaction temperature corresponding toward a target crosslinking density of the resin in the photocured state in Block S130. The method S100 also includes, for a first build cycle, in response to the resin reservoir exhibiting a first temperature proximal the target bulk resin temperature, in response to the gaseous environment exhibiting a second temperature proximal the target chamber temperature, and in response to the interface layer exhibiting a third temperature proximal the target reaction temperature: at the resin interface, selectively photocuring a first volume of the resin reservoir to form a first layer of a build adhered to a build platform in Block S140; and retracting the build platform from the build window in Block S150.

Figure 2:
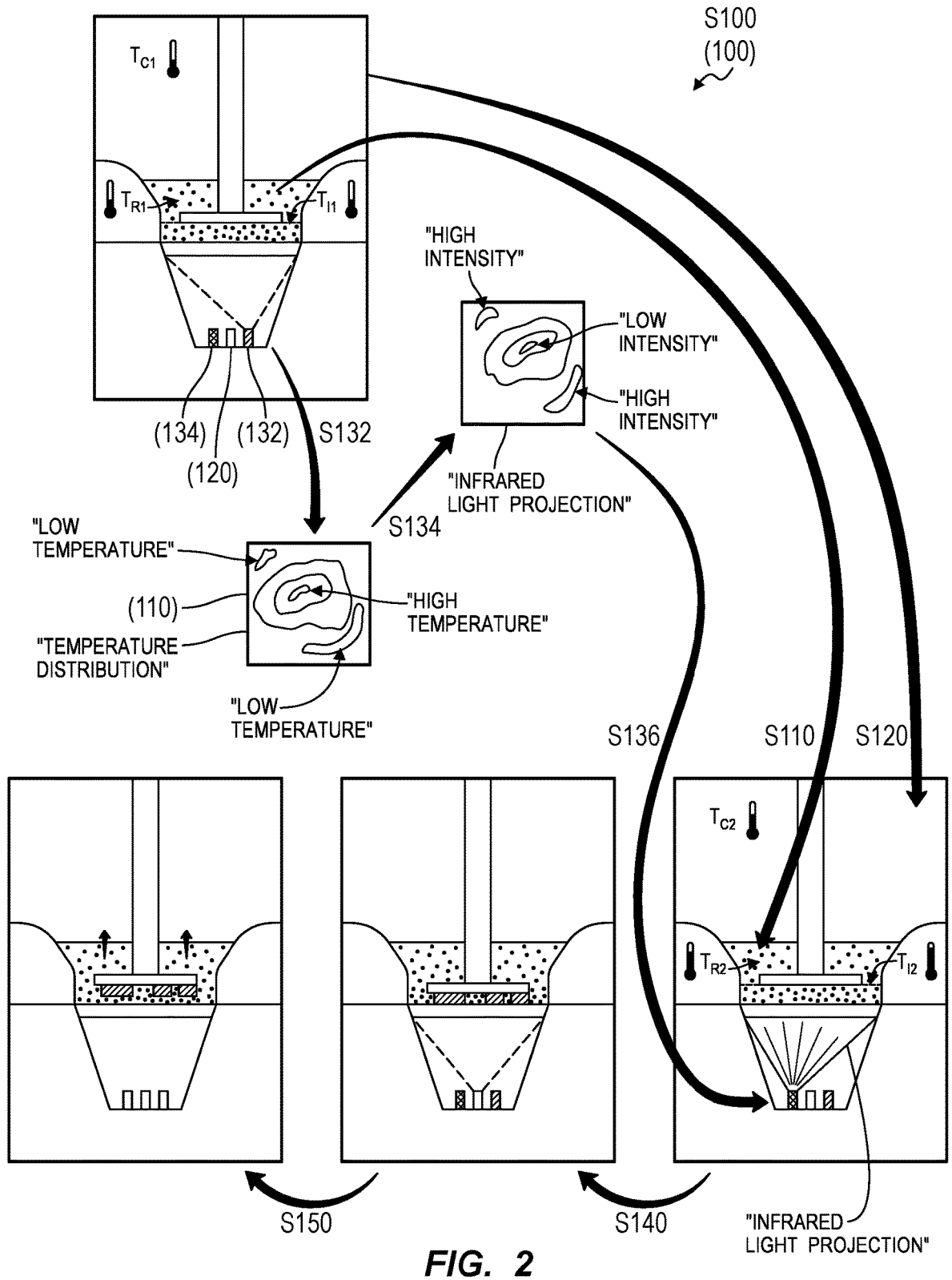
FIG. 2 is a flowchart representation of one variation of the method.

As shown in FIG. 2, one variation of the method S100 includes: at a build tray arranged over a build window and containing a resin reservoir of a resin, heating the resin reservoir toward a target bulk resin temperature less than a heat deflection temperature of the resin in a photocured state, the target bulk resin temperature corresponding toward a target viscosity of the resin in a liquid state in Block Silo; at the build chamber containing a gaseous environment and encompassing the build tray and the build window, heating the gaseous environment toward a target chamber temperature less than a heat deflection temperature of the resin in the photocured state in Block S120; at a resin interface between a surface of the build window and the resin reservoir, detecting a temperature distribution across an interface layer of the resin reservoir via a thermal image sensor arranged below the build window and defining a field of view encompassing the resin interface in Block S132; calculating an infrared light projection predicted to heat the interface layer to a uniform temperature proximal a target reaction temperature across the resin interface, the target reaction temperature corresponding toward a target crosslinking density of the resin in the photocured state in Block S134; and projecting the infrared light projection toward the build window in Block S136. This variation of the method S100 also includes, for a first build cycle, in response to the resin reservoir exhibiting a first temperature proximal the target bulk resin temperature, in response to the gaseous environment exhibiting a second temperature proximal the target chamber temperature, and in response to the interface layer exhibiting a third temperature proximal the target reaction temperature: at the resin interface, selectively photocuring a first volume of the resin reservoir to form a first layer of a build adhered to a build platform in Block S140; and retracting the build platform from the build window in Block S150.

2. Applications

Generally, Blocks of the method S100 are executed by an additive manufacturing system 100 (hereinafter the "system 100") to regulate a bulk temperature of resin stored in a resin reservoir within a build tray 140, thereby: controlling resin viscosity and resin flow toward a build window 110 following each successive layer of a build; and maintaining previous photocured layers of the build below a heat deflection temperature. Other Blocks of the method S100 are concurrently executed by the system 100 to regulate an interface temperature of an interface layer of resin adjacent the build window 110 (i.e. at the resin interface of the build window 110) during fabrication of a current layer of the build, thereby: controlling and/or increasing crosslinking density of the photocured resin; and increasing green strength of the current layer during fabrication.

More specifically, the system 100 can implement a digital light process (hereinafter "DLP") or a continuous digital light process (hereinafter "CDLP") to selectively photocure target regions of successive layers of resin during a series of build cycles in order to transform a liquid resin into a solid structure (hereinafter the "build"). During each build cycle, the system 100 can execute Blocks of the method S100 to regulate the bulk temperature of the liquid resin and to regulate local temperatures of a thin layer (or film) of resin across the build window 110 as the system 100 selectively photocures regions of this thin layer of resin (e.g., via a DLP or CDLP process) in order to: control green characteristics of the build (e.g., increase the green strength of the build); increase the photocuring rate of the resin (and thus decrease the duration of each build cycle); increase flow rate of resin from the resin reservoir to the build window 110 (e.g., due to reduced viscosity of the liquid resin); enable fabrication of builds with resins exhibiting higher viscosities at room temperature; prevent deflection of photocured resin in previous layers of the build due to excess heat exposure. Thus, the system 100 can generate a build characterized by high dimensional accuracy and controlled mechanical properties from high viscosity resins.

Figure 3:
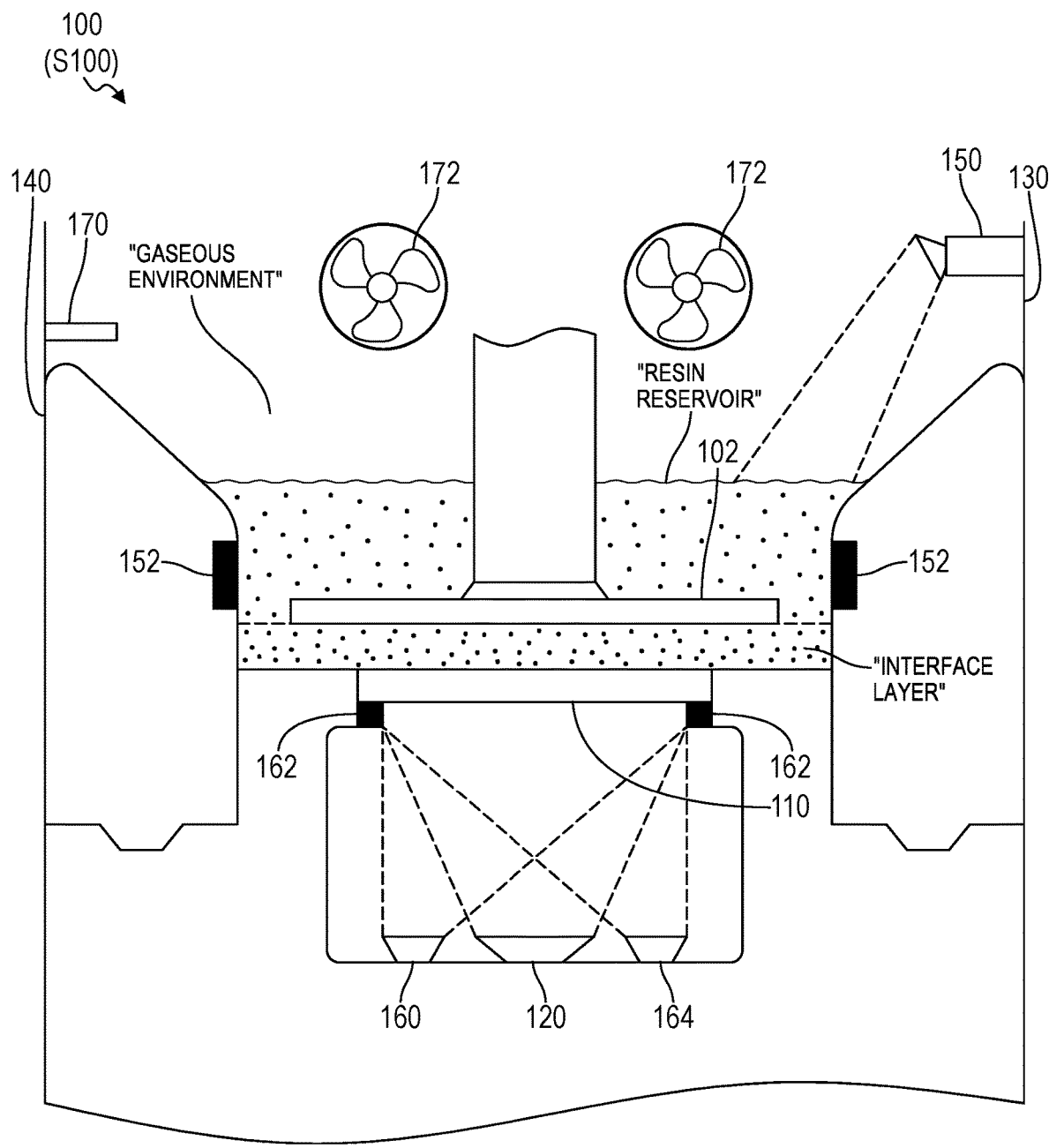
FIG. 3 is a schematic representation of a system.

As shown in FIG. 3, the system 100 can include a projection subsystem 120, a build window 110 arranged above the projection subsystem 120 and defining a surface coincident with the focal plane of the projection subsystem 120, a build tray 140 configured to contain a resin reservoir above the build window 110, a build chamber 130 enclosing the build tray 140 and the build window 110, and a vertically mobile build platform 102 configured to position a build parallel to and offset from the build window 110 in preparation for photocuring a layer of the build, and to retract the build from the build window 110 in preparation for photocuring a successive layer of the build. Also shown in FIG. 3, the system 100 can include a chamber temperature control subsystem configured to control the gaseous environment within the build chamber 130, a set of build tray 140 heating elements integrated with the build tray 140 configured to control the bulk temperature of the resin reservoir, and an interface heating source (e.g., a set of interface heating elements 162) configured to control the interface temperature of the resin at the resin interface with the build window 110. In one variation, the system 100 can include a thermal image sensor 160 arranged below the build window 110 and configured to detect an interface temperature distribution across the resin interface and an infrared projection subsystem 120 configured to selectively heat regions of the resin interface, thereby enabling the system 100 to execute Blocks of the method S100 to achieve targeted heating at the resin interface to achieve a target temperature profile at the resin interface (e.g., a uniform temperature profile). Thus, the system 100 is configured to execute Blocks of the method S100 to selectively cure consecutive layers of a build via an additive manufacturing process while: maintaining an interface temperature proximal a target reaction temperature at the resin interface; maintaining a bulk resin temperature proximal a target bulk resin temperature in the resin reservoir; and maintain a chamber temperature proximal a target chamber temperature.

2.1 Resin Viscosity

By elevating and controlling the temperature of the resin in the resin reservoir, the system 100 can reduce the viscosity of the resin, thereby increasing the flow rate of the resin toward voids in the resin reservoir caused by retraction of the build platform 102 and reducing fluid mechanical forces on the newly photocured build as the build is retracted from the resin reservoir. Thus, the system 100 can manufacture builds from resins, materials, or any other chemistries exhibiting high viscosities or existing in a solid phase when at room temperature.

2.2 Crosslinking Density

The system 100 can control the temperature of the resin at the resin interface by monitoring and adjusting the interface temperature of the resin layer adjacent the interface between the resin and the build window 110 in order to increase the resin interface temperature above the bulk resin temperature of the resin reservoir. In particular, for many chemistries, photocuring reactions that occur at higher temperatures result in higher crosslinking density in the photocured product due to increased free radical mobility during a photocuring phase of the manufacturing process. Therefore, when applied over multiple build cycles, the system 100 can decrease manufacturing time for a build while maintaining the same crosslinking density or can increase crosslinking density while maintaining the same build time.

The system 100 can heat the interface layer of resin at the resin interface via an interface heat source to increase the temperature of the resin interface relative to the bulk temperature of the resin reservoir. Thus, the system 100 can maintain a consistent interface temperature proximal a target reaction temperature across the resin interface such that, upon selectively photocuring volumes of the resin during the additive manufacturing process, each region of the layer photocures at a temperature proximal the reaction temperature of the resin across the entire volume of the photocured layer.

The system 100 can directly heat the resin interface in order to maintain a specific interface temperature at the resin interface via a set of heating elements (i.e. interface heat sources). For example, the system 100 can include an infrared lamp, or transparent heating element imbedded in the build window 110, configured to uniformly heat the build window 110 and by extension the resin interface. Alternatively, the system 100 can selectively heat regions of the resin interface on a pixel-by-pixel basis in order to maintain an interface temperature proximal a target reaction temperature at the resin interface and to provide localized control of the temperature at the resin interface. For example, the system 100 can include a digital infrared projector 164 (hereinafter "IR projector"), such as an infrared DLP projector, which can be configured to selectively illuminate pixels of the screen in order to selectively heat relatively low-temperature regions of the resin interface thereby eliminating temperature gradients across the resin interface.

2.3 Temperature Gradients

In implementations of the system 100 including an IR projector 164, the system 100 can execute closed-loop controls to reduce temperature gradients (e.g., resulting in a uniform temperature distribution) across the resin interface during fabrication of a layer of the build. In particular, exothermic photocuring of selective regions of a layer of resin across the resin interface may produce temperature gradients (e.g., local "hot spots") across the resin interface. Therefore, the system 100 can monitor temperatures across the resin interface and selectively irradiate regions of the resin interface (e.g., with an IR projector 164) to locally heat cooler regions across the resin interface, thereby reducing temperature gradients across the resin interface. By reducing such temperature gradients across this layer of resin while selectively curing regions of this layer of resin, the system 100 can reduce formation of internal stresses within these curing regions of the layer, thereby reducing deflection of these cured regions as the build cools and increasing dimensional accuracy of the build upon completion.

More specifically, the system 100 can monitor the interface temperature at the resin interface via a thermal (infrared or near-infrared) image sensor (with a field of view spanning the build window 110), for example, to measure the interface temperature across the resin interface and to identify low-temperature and high-temperature regions relative to the overall temperature of the resin layer at the resin interface. The system 100 can then calculate an infrared light projection for the IR projector 164 that is predicted to increase the temperature of the low-temperature regions toward the target reaction temperature while allowing the high-temperature regions to cool toward the target reaction temperature. Thus, when the system 100 photocures a subsequent layer of the build, all regions of the subsequent layer will photocure at a temperature proximal the target reaction temperature.

Additionally or alternatively, the system 100 can selective heat regions of the resin interface via the IR projector 164 such that the resin interface exhibits a non-uniform target temperature profile. For example, the system 100 can selectively heat regions of the resin interface coinciding with a geometry of a successive layer of the build. In another example, the system 100 can reduce incident IR radiation from the IR projector 164 toward the center of builds characterized by a large cross-sectional area, thereby preventing over-curing of the resin at the center of these features.

2.4 Look Ahead

In another implementation, the system 100 can execute look-ahead controls and a thermodynamic model of the build chamber 130 in order to account for heat energy (i.e. exothermal heat output) generated by the photocuring reaction of each photocured layer and to adjust the bulk resin temperature of the resin reservoir and/or the interface temperature of the interface layer of resin adjacent the build window 110 in response to the exothermal output corresponding to a subsequent photocured layer. For example, the system 100 can estimate the amount and distribution of exothermal heat output (across the resin interface) that will be released by photocuring the current and/or subsequent layers of the build being manufactured and account for this added energy when calculating the current infrared light projection or energy projection for the IR projector 164 or other heat source respectively. In response to calculating that the temperature at the resin interface will exceed a target temperature upon photocuring the subsequent layer, the system 100 can slow the print speed (thereby reducing the rate at which resin is photocured) and/or reduce the bulk resin temperature of the resin reservoir to increase heat flux away from the interface layer.

2.5 Terminology

The method S100 is described herein as executed by a system 100 to detect temperatures "proximal" specific target temperatures. Generally, the phrase "a first temperature proximal a target temperature" refers to the first temperature being close to or equal toward the target temperature. In one implementation, the system 100 can identify "proximity" of a first temperature toward a target temperature in response to detecting the first temperature within a threshold temperature interval (e.g., ±one degree Celsius) of the target temperature. Alternatively, the system 100 can detect proximity of a first temperature toward a target temperature by detecting that the first temperature is equal toward the target temperature within a pre-characterized measurement error of the instrument that detected the temperature. Thus, the system 100 can execute blocks of the method S100 in response to measuring a first temperature proximal a target temperature.

The method S100 is described herein as executed by a system 100 to detect and/or adjust the temperature of various regions of resin contained within the system 100 and/or the gaseous environment within the build chamber 130. Hereinafter, when detecting or adjusting the bulk temperature (e.g., average temperature) of the resin reservoir (e.g., not including the layer of resin immediately adjacent the resin interface), the system 100 is described as detecting or adjusting the "bulk resin temperature" of the resin reservoir. Hereinafter, when detecting or adjusting the temperature of the layer of resin immediately adjacent (e.g., within the layer thickness of the build, 10-100 microns) to the resin interface, the system 100 is described as detecting or adjusting the "interface temperature" of the "interface layer" of the resin reservoir. Hereinafter, when detecting or adjusting the temperature of the gaseous environment within the build chamber 130 and over the surface of the resin reservoir, the system 100 is described as detecting or adjusting the "chamber temperature" of the "gaseous environment."

The method S100 is described herein as executed by a system 100 to "heat" regions or components within the system 100 "toward" target temperatures. However, by "heating" a region or component of the system 100 "toward" a target temperature the system 100 may overshoot this target temperature. Therefore, in "heating" a region or a component within the system 100 "toward" a target temperature the system 100 may also passively cool (e.g., by reducing thermal energy input toward the system 100) or actively cool (e.g., via active cooling subsystems) regions or components within the system 100 in order to maintain the target temperature at the region or component within the system 100. Alternatively, the foregoing process of controlled heating by the system 100 may be referred alternatively as "maintaining" a target temperature of a region or component within the system 100 or as "controlling" a temperature of a region or component within the system 100 at the target temperature of that region or component.

3. System

The system 100 executing the method S100 can include an assembly of electromechanical components controlled by an imbedded computational device running computer code (hereinafter the "controller"). More specifically, the system 100 includes a base assembly and a removable tray assembly (hereinafter "tray assembly"). The base assembly can include: a projection subsystem 120, a build window 110, a vertically mobile build platform 102, and a build chamber 130. The tray assembly can include a build tray 140 configured to engage with the base assembly and contain the resin reservoir above the build window 110 and within the build chamber 130, thereby enabling the system 100 to project electromagnetic radiation into a layer of resin adjacent the resin interface (i.e. the interface layer). The system 100 also includes electromechanical components configured to detect and regulate the chamber temperature of the gaseous environment of the build chamber 130, the bulk resin temperature of the resin reservoir in the build tray 140, and the interface temperature of the interface layer of resin adjacent the resin interface. These electromechanical components can include, the chamber temperature control subsystem, the resin temperature control subsystem, and the interface temperature control subsystem. Each of these temperature control subsystems are described in further detail below.

The system 100, in Blocks of the method S100, can execute a "bottom-up" digital light process (e.g., "DLP"). The projection subsystem 120 can therefore face upward and project electromagnetic radiation (e.g., ultraviolet, near-ultraviolet, or visible) light through the build window 110 into the interface layer of resin at the resin interface (i.e. the interface between the reservoir and the build window 110); and the build platform 102 can be arranged vertically over the projection subsystem 120 and build window 110 and can be configured to advance and retract vertically as layers of a build are selectively photocured at the resin interface by electromagnetic radiation output by the projection subsystem 120. Additionally, the projection subsystem 120, build window 110, and build platform 102 can be fully enclosed by a sealed (i.e. airtight) build chamber 130, thereby enabling control of the ambient pressure and bulk temperature of the resin reservoir.

3.1 Projection Subsystem

The projection subsystem 120 is upward facing, is housed in the base assembly, and can include one or more projectors configured to project electromagnetic radiation in an emissive spectrum, which can include the ultraviolet (hereinafter "UV"), visible, or near infrared (hereinafter "NIR") spectrum. The projection subsystem 120 can emit electromagnetic radiation in one or more wavelength bands tuned to the chemical and physical properties of the resin and its specific curing process. For example, the projection subsystem 120 (e.g., a digital UV projector) can project electromagnetic radiation in an emissive spectrum of 300-nanometer to 450-nanometers. The projection subsystem 120 is electrically coupled to the controller; receives potentially software-modified frames corresponding to full or partial cross-sections of a three-dimensional model of the build; and projects electromagnetic radiation through the build window 110 to selectively photocure volumes of the resin according to build settings and the received frames.

In one variation, the system 100 can include a projection subsystem 120, which further includes a set of light sources, such as projectors or other electromagnetic emitting devices. In this variation, each irradiation source of the projection subsystem 120 can define a projective area within the build window 110 in order to maintain a higher resolution across the build window 110 via tiling or stitching techniques. Additionally or alternatively, each light source can define a separate emissive spectrum enabling the projection subsystem 120 to project electromagnetic radiation within multiple combinations of spectral bands.

In one variation, the projection subsystem 120 includes a UV or near-UV laser and scans (e.g., as a raster) a laser beam across the build window 110 according to frames received from the controller in order to selectively photocure a volume of resin at the resin interface.

3.2 Build Window

The build window 110 is mounted to the base assembly and further defines the horizontal reference plane for builds manufactured in the system 100. The build window 110 is arranged above the projection subsystem 120 and aligned with the projection area of the projection subsystem 120 such that the focal plane of the projection subsystem 120 coincides with the resin interface. Generally, the build window 110 is substantially transparent (e.g., exhibiting greater than 85% transmittance) to the emissive spectrum of the projection subsystem 120 and thus passes electromagnetic radiation output by the projection subsystem 120 into the resin above the build window 110. The build window 110 also functions as a rigid support and reference surface for the interface layer of resin arranged thereover. The build window 110 is statically mounted to a base assembly that can include the projection subsystem 120, the build platform 102 and/or the build chamber 130 to ensure repeatable, accurate alignment between the build window 110 and the rest of the base assembly. The interface between the base assembly and the build window 110 is also gas-impermeable such that a pressure gradient, such as 300 kilopascals, can be sustained across the build window 110.

The base assembly can include a build window 110 manufactured from a pane of transparent, rigid glass, such as amorphous/silicate or crystalline/ceramic glass. In particular, the build window 110 can be both transparent to UV (or other) light output by the projection subsystem 120 and can be substantially rigid, hard, and temperature-stable to form a robust, flat reference surface that may exhibit minimal deflection or deformation during multiple build cycles, thereby yielding high and consistent build quality.

In one variation, the base assembly can include a build window 110 that is transmissive to infrared (hereinafter "IR") radiation such that a thermal image sensor 160 positioned below the build window 110 can accurately calculate the temperature of the resin at the resin interface. In this variation, the system 100 can also transmit IR radiation directly through the build window 110, thereby enabling targeted heating of specific regions of the interface layer of resin.

3.3 Build Platform

Generally, the base assembly also includes a vertically mobile build platform 102 to which a first layer of the build adheres and from which the build is suspended toward the build window 110 during a manufacturing process. More specifically, the base assembly can include a build platform 102 defining a planar surface opposite and substantially parallel to the upper surface of the build window 110; and a linear actuation system 100 (including a single linear actuator or multiple timed linear actuators) configured to vertically translate the build platform 102 relative to the build window 110. In one implementation, the system 100 can include a build platform 102 defining negative features, such as channels or through holes to increase the flow of resin out from under the build platform 102 during advancement of the build platform 102 into the resin reservoir and to facilitate (by reducing the adhered surface area) the removal of the build from the build platform 102 after completion of the build.

The build platform 102 is a vertically actuating surface opposite the build window 110. The system 100 can include a linear actuation system 100 (with increments as small as 0.1 microns) mechanically coupled to the build platform 102. Additionally, during actuation of the linear actuation system 100, the controller: can track forces applied by the linear actuation system 100 to the build platform 102 (e.g., based on a current draw of the linear actuation system 100 or by sampling a force sensor or strain gauge coupled to the build platform 102); and implement closed-loop techniques to control movement of the linear actuation system 100 in order to achieve a particular distribution of separation forces. Thus, during the build cycle, the linear actuation system 100 lowers the build platform 102 to specific heights above build window 110 such that photocured resin adheres to the build surface of the build platform 102 facing the build window 110. As the system 100 selectively cures successive layers of the build according to Blocks of the method S100, the system 100 can retract the build platform 102 upward by a first distance in order to separate the current layer of the build from the build window 110 and then advance the build platform 102 in preparation for curing a successive layer of the build.

3.4 Build Chamber

The system 100 includes a sealed (i.e. airtight up to five atmospheres build chamber 130 that encloses) the build window 110, build tray 140, build platform 102 and/or any of the other previously described components of the system 100. The build chamber 130 is configured to allow access to the build platform 102 and to allow insertion and removal of the build tray 140 (e.g., via a hatch/door system 100) to remove completed builds from the system 100, to fill the build tray 140 with resin, and/or to remove and replace the build tray 140. Additionally, the build chamber 130 contains the gaseous environment located above the resin reservoir and the build tray 140 into which the build platform 102 is retracted during the manufacturing process. Therefore, the build chamber 130 can include fluid ports and/or valves in order to pressurize and/or exchange gas from within the build chamber 130 with the ambient environment and/or with an inert gas reservoir.

In one implementation, further described below, the build chamber 130 can cooperate with a resin dispensing system 100 to regulate the volume of resin contained within the build tray 140 without opening the build chamber 130.

3.5 Build Tray

The tray assembly includes a build tray 140 configured to engage (and kinematically align with) the base assembly of the system 100. Generally, the build tray 140 contains the resin reservoir during a build cycle such that the resin reservoir is evenly distributed across the build window 110 at the resin interface.

The build tray 140 defines the volume occupied by the resin reservoir during the manufacturing process and the build area for the build created during the manufacturing process. In one implementation, the upper member of the build tray 140 defines a rectangular build area. Additionally, the build tray 140 can define an inner surface that extends upward and perpendicular to the build window 110. The inner surface then angles upward and outward in a conical shape, wherein the vertical cross section of the conical inner surface has dimensions proportionally similar to the vertical cross-section of the perpendicular inner surface. Thus, the perpendicular and conical sections of the inner surface define a volume for containing the resin reservoir. However, the build tray 140 can define any rounded internal volume. Additionally, the build tray 140 can include integrated heating and/or cooling elements (e.g., resistive cooling elements or water-cooling systems) as further described below. The system 100 can activate the heating and/or cooling elements to adjust the bulk resin temperature within the build tray 140, as is further described below.

The build tray 140 can also interlock with reference surfaces in the base assembly. In one implementation, the base assembly and/or the build tray 140 contain magnets, which kinematically align the build tray 140 to the base assembly by biasing the build tray 140 against the reference surfaces in the base assembly. Additionally, the build tray 140 can include rubber gaskets arranged at the interface between the build tray 140 and the base assembly, thereby preventing egress of the resin from the resin reservoir held by the build tray 140 between the build tray 140 and the base assembly. Therefore, the build tray 140 can be kinematically positioned over the build window 110 such that the inner surface of the build tray 140 and the upper surface of the build window 110 form a volume, which can contain the resin reservoir.

The build tray 140 can be constructed from a rigid, non-reactive, temperature stable solid material, such as aluminum or another metal. In one implementation, the build tray 140 is constructed from milled aluminum. Additionally, the build tray 140 can be a member of a set of build trays 140 associated with the system 100, each build tray 140 in the set of build trays 140 characterized by a different shape or size.

3.6 Controller

The base assembly of the system 100 can include a controller that controls the electromechanical components of the system 100. Generally, the controller is an imbedded computer system 100 that sends instructions to the projection subsystem 120, the build platform 102, the resin temperature control subsystem, the interface temperature control subsystem, and the chamber temperature control subsystem to execute Blocks of the method S100. In one implementation, the controller controls and receives instructions from a user interface, which can be a touchscreen or a set of buttons, switches, nobs, etc. Alternatively, the controller can communicate with and receive instructions from an external computational device. In another implementation, the controller is connected to a network, such as the internet, and is configured to receive instructions over the network. Additionally, the controller can send commands, in the form of digital and/or analog electrical signals, in order to actuate various electromechanical components of the system 100 such as a door hatch release to the build chamber 130, the purge valves, and/or lighting elements within the build chamber 130. Furthermore, the controller can receive data from sensors integrated with the system 100 and execute feedback control algorithms based on these data in order to adjust the function of the projection subsystem 120, the build platform 102, the resin temperature control subsystem, the interface temperature control subsystem, and the chamber temperature control subsystem.

3.7 Resin Temperature Control Subsystem

Generally, the system 100 can include a resin temperature control subsystem that is configured to control the bulk resin temperature of the resin reservoir contained with the build tray 140. Depending on the implementation, the system 100 can include multiple types of temperature sensing devices and/or heating or cooling devices.

In one implementation, the system 100 includes a set of temperature sensors integrated with the build tray 140 (e.g., thermocouples, thermistors, digital thermometers) and communicatively coupled to the controller. In this implementation, the set of temperature sensors can be distributed along the inner wall of the build tray 140 such that the system 100 can calculate a representative bulk temperature for the resin reservoirs based on temperature readings from each of the set of temperature sensors.

In another implementation, the system 100 can include a chamber-mounted thermal image sensor 160 defining a field of view coincident with the surface of the resin reservoir contained within the build tray 140. Thus, the system 100 can detect the bulk resin temperature of the resin reservoir via a thermal image sensor 160 arranged within the build chamber 130 and defining a field of view incident a surface of the resin reservoir.

In yet another implementation, the system 100 can include a set of heating elements 152 integrated with the build tray 140 and configured to heat the resin reservoir within the build tray 140. For example, the system 100 can include resistive heating elements within the build tray 140. Alternatively, the system 100 can include a fluid heating system 100 configured to circulate heated water (or another working fluid) through channels within the structure of the build tray 140, thereby heating the resin reservoir contained within the build tray 140. Additionally or alternatively, the system 100 can include a fluid cooling system 100 configured to flow circulate cooled water (or another working fluid) through separate channels within the structure of the build tray 140.

Thus, via some combination of the detection elements and heating and/or cooling elements described above, the system 100 can control the bulk resin temperature based on instructions received from the controller.

3.8 Interface Temperature Control Subsystem

Generally, the system 100 can include an interface temperature control subsystem configured to control the temperature of a resin layer adjacent the resin interface with the build window 110. More specifically, the system 100 can include: a set of temperature sensing elements configured to measure the temperature of the interface layer of resin (e.g., either an average temperature or a temperature distribution); and a set of heating elements configured to increase the interface temperature relative to the bulk resin temperature. In one implementation, the system 100 can include a set of temperature sensing elements such as a set of thermocouples, thermistors, or digital thermometers arranged at the perimeter of the build window 110 and configured to measure the temperature of the build window 110. Thus, the system 100 can indirectly measure the temperature of the interface layer via conduction through the build window 110.

Additionally or alternatively, the system 100 can include an interface thermal image sensor 160, which can directly measure infrared or near-infrared radiation emitted by the interface layer of resin and calculate the temperature of the interface layer for each pixel of the interface thermal image sensor 160. Additionally, the interface temperature control subsystem can include additional interface heat sources further described below.

3.8.1 Interface Thermal Image Sensor

The system 100 can also include a thermal image sensor 160 arranged under the build window 110 and configured such that the field of view of the thermal image sensor 160 spans the area of the resin interface of the build window 110. Thus, the system 100, via the thermal image sensor 160, can detect the interface temperature of the resin at the resin interface. The thermal image sensor 160 is electrically coupled to the controller, thereby enabling the controller to record thermal images of the resin interface according to Blocks of the method S100. In one implementation, the thermal image sensor 160 is arranged relative to the projection subsystem 120 and interface heat source such that pixels in images captured from the thermal image sensor 160 correspond to pixels for projection of electromagnetic radiation from the projection subsystem 120 and/or areas of the resin interface at which the interface heat source can precisely direct heat. In one implementation, the thermal image sensor 160 operates in the long-wavelength IR range (i.e. 8-15 micrometers), thereby enabling the interface thermal image sensor 160 to detect temperature differences within the resin. Additionally or alternatively, the thermal image sensor 160 can operate within the mid-wavelength IR range (i.e. 3-8 micrometers). Thus, the system 100 can detect a temperature of the interface layer via a thermal image sensor 160 arranged below the build window 110 and defining a field of view encompassing the resin interface.

3.8.2 Interface Heat Source

The system 100 includes an interface heat source that is configured to direct heat toward the resin interface of the build window 110. Depending on the implementation of the system 100, the interface heat source can selectively heat regions of the resin interface or it can apply heat spanning the whole resin interface. In one implementation, the system 100 includes an IR lamp as the interface heat source, arranged below the build window 110 (adjacent the projection subsystem 120 and/or the interface thermal image sensor 160), and configured to direct IR light toward the resin interface from below, thereby broadly heating the interface layer of resin at the resin interface. In another implementation, the system 100 can include a transparent resistive heating element imbedded within the build window 110 (e.g., a conductive optically clear film) configured to selectively heat regions of the resin interface or broadly heat the build window 110, thereby evenly transferring heat to the resin at the resin interface. Additionally or alternatively, in this implementation, the system 100 can selectively heat regions of the resin interface by selectively activating corresponding regions of the transparent resistive heating element. Thus, the system 100 can heat the resin interface according toward a target temperature profile.

In yet another implementation, the system 100 can include a set of heating elements (e.g., resistive heating elements) arranged around the perimeter of the build window 110 and configured to conduct heat into the build window 110, thereby indirectly heating the interface layer of resin adjacent the upper surface of the build window 110. Thus, the system 100 can heat the interface layer of the resin reservoir toward the target reaction temperature via the set of heating elements arranged along a perimeter of the build window 110.

Alternatively, the system 100 can include a digital IR projector 164 as the heat source to selectively heat regions of the resin interface based on a temperature distribution recorded by the thermal image sensor 160. More specifically, the system 100 can heat the interface layer of the resin reservoir toward the target reaction temperature via an IR projector 164 defining a projection area aligned with the build window 110.

The IR projector 164 can include a digital micromirror device (hereinafter "DMD"), an IR source, and a series of optical lenses configured to direct IR light from the IR source to various locations across the resin interface (such as according to a DLP projector). Thus, by digitally adjusting the configuration of the DMD, the system 100 is able to selectively direct IR light through the build window 110, on a pixel-by-pixel basis, thereby selectively heating the resin at the resin interface.

3.9 Chamber Temperature Control Subsystem

The system 100 can also include a chamber temperature control subsystem configured to heat and/or pressurize the build chamber 130 to a specified temperature and pressure. Thus, the chamber temperature control subsystem can include multiple electromechanical components configured to vent air or inert gases into and out of the build chamber 130, chamber heating elements 172 within the build chamber 130, heating elements outside the build chamber 130 to preheat gas being pumped into the build chamber 130, a digital thermometer 170 configured to record the chamber temperature of the gaseous environment within the build chamber 130 in order to implement temperature control algorithms (e.g., PID controls, or thermodynamic models of the build chamber 130 environment) to adjust the temperature within the build chamber 130, and/or pressure sensors configured to record the pressure within the build chamber 130 in order to regulate the pressure according to pressure control algorithms. Thus, the system 100 can control the temperature and pressure of the gaseous environment within the build chamber 130 via the controller communicating with the chamber temperature control subsystem.

4. Material Loading and Initialization

Before the system 100 executes the method S100, the build tray 140 is positioned onto the base assembly, and resin is loaded into the volume defined by the build tray 140 and the build window 110. If the resin is not sensitive to oxygen and/or ambient air, the resin may be poured directly into the build tray 140. However, if the resin is sensitive to oxygen and/or ambient air, the resin can be dispensed into the build tray 140 once the build chamber 130 has been pressurized with an inert gas.

Thus, after loading is complete, the internal volume defined by the inner surface of the build tray 140 is at least partially occupied by a volume of resin. The resin is in contact with the upper surface of the build window 110 (or a transparent membrane arranged across the build window 110) and the inner surface of the build tray 140.

4.1 Resin Dispensing Subsystem

In one implementation, the system 100 includes a resin dispensing subsystem configured to: dispense resin, stored in an external resin supply, into the build tray 140 in order to maintain a consistent resin level within the build tray 140; and preheat this resin such that the injection of additional resin into the resin reservoir does not significantly disrupt the bulk resin temperature of the resin reservoir. In order to maintain the same level of resin in the build tray 140, the system 100 can access the layer geometry of a subsequent layer and calculate the volume of resin to be photocured in this layer and dispense an equal volume of resin into the resin reservoir via the resin dispensing subsystem. More specifically, the system 100 can: access a layer geometry for a build cycle; calculate a replacement volume of the resin based on the layer geometry approximating the volume of the resin photocured in the layer geometry; at the resin dispenser subsystem, preheat the replacement volume to a temperature proximal the target bulk resin temperature; and, in response to retracting the build platform 102 from the build window 110, dispense the replacement volume into the resin reservoir via the resin dispenser subsystem. Thus, the system 100 can inject additional resin into the resin reservoir to keep the resin level consistent during the manufacturing process without disrupting the bulk resin temperature of the resin reservoir or requiring a user to open the build chamber 130 and therefore disrupt the build chamber 130 temperature and or temperature of the gaseous environment within the build chamber 130.

In one implementation, the system 100 communicates, via the controller, with the resin dispensing subsystem in order to preheat the input resin from the resin dispensing system 100 to a temperature proximal the bulk resin temperature of the resin reservoir. More specifically, the system 100 can include a heat exchanger connected to the resin dispensing subsystem and can heat the input resin to a temperature proximal the bulk resin temperature via the heat exchanger. The system 100 can also include a set of electromechanical valves to control the flow of the input resin through the heat exchanger and to meter the amount of input resin injected into the resin reservoir.

In another implementation, the system 100 can include a set of resin dispensing ports arranged around the perimeter of the build tray 140 in order to distribute the input resin evenly throughout the resin reservoir, thereby preventing the formation of temperature gradients or bulk resin flow in the resin reservoir. For example, the system 100 can include four resin ports, each arranged on one side of a rectangular build tray 140. Thus, the system 100 can evenly dispense resin in the build chamber 130.

4.2 Phase Change Detection

In some applications, the system 100 can manufacture builds from a resin that is a solid at room temperature. Therefore, the system 100, or a user operating the system 100, cannot simply dispense or pour the resin, respectively, into the build tray 140. However, in one implementation, the system 100 can: heat a solid quantity of resin placed upon the build tray 140 within the build chamber 130; and detect (via a visual light or IR image sensor) when this solid volume of resin has undergone a phase change prior to initiating further Blocks of the method S100. More specifically, the system 100 can: at the build tray 140, melt a quantity of the resin in a solid state; and detect a phase change of the quantity of the resin to form the resin reservoir via a light image sensor arranged within the build chamber 130; in response to detecting the phase change, at the build tray 140, heat the resin reservoir toward the target bulk resin temperature; in response to detecting the phase change, at the build chamber 130, heat the gaseous environment toward the target chamber temperature; and, in response to detecting the phase change, heat the interface layer of the resin reservoir toward the target reaction temperature. Thus, the system 100 can effectively initiate a build that utilizes a resin that is in a solid state at room temperature by automatically detecting when the resin has melted prior to initiating successive Blocks of the method S100.

5. Manufacturing Process

The system 100 can execute the method S100 prior to and during a DLP or CDLP process to: heat the resin reservoir toward a target bulk resin temperature less than a heat deflection temperature of the resin in a photocured state in Block S110; heat the gaseous environment in the build chamber 130 toward a target chamber temperature in Block S120; and to heat an interface layer of the resin reservoir toward a target reaction temperature in Block S130. Due to continuous heat loss from the system 100 to the ambient environment, the system 100 can continuously execute Blocks S110, S120, and S130 in order to maintain temperatures in the resin reservoir, the gaseous environment, and the interface layer proximal the corresponding target temperatures throughout the manufacturing process. Thus, the system 100 can selectively photocure a volume of the resin in the interface layer in Block S140, and retract the build platform 102 to which the build is adhered in Block S150, in response to the temperatures of the resin reservoir, the gaseous environment, and the interface layer being proximal the corresponding target temperatures. In yet another implementation, the system 100 can execute Blocks S140 and S150 upon detecting that the bulk resin temperature of the resin reservoir is proximal a target bulk resin temperature, the interface temperature of the interface layer of the resin is proximal a target reaction temperature, and/or the chamber temperature is proximal the target chamber temperature. Additionally or alternatively, the system 100 can execute Blocks S140 and S150 in response to detecting that the interface layer a target interface temperature distribution (e.g., a distribution exhibiting low variance relative toward the target temperature).

5.1 Photocuring

Generally, upon execution of Blocks S110, S120, and S130 (further described below), the system 100 selectively photocures a volume of resin to form a layer of a build in Block S140. More specifically, the system 100 can, at the resin interface, selectively photocure a volume of the resin reservoir in the interface layer to form a first layer of a build adhered to a build platform 102 or a subsequent layer of the build adhered to a prior layer of the build, thereby manufacturing the build from a series of consecutive photocured layers of resin. In particular, once the bottom surface of the build platform 102 or the prior layer of the build adhered to the build platform 102 has lowered into the resin at a height above the resin interface equal to a predetermined layer thickness of the build, the controller instructs the projection subsystem 120 to project electromagnetic radiation within the emissive spectrum to selective areas of the interface layer of resin between the build window 110 and the build platform 102 corresponding to a first layer of a build.

The resin is configured to photocure upon exposure to the electromagnetic radiation within the emissive spectrum. Thus, a volume of resin in the interface layer of resin photocures within the selective areas exposed to the electromagnetic radiation within the emissive spectrum.

However, the system 100 can selectively photocure a volume of resin between the build platform 102 and the build window 110 utilizing any stereolithographic and/or DLP technique.

5.2 Layer Progression

Generally, upon photocuring a layer of the build in Block S140, the system 100 can retract the build platform 102 away from the build window 110 in order to prepare to photocure a subsequent layer of the build. More specifically, the system 100 actuates the build platform 102 and adhered build such that the bottom surface of the build is a distance approximately equal to a predetermined single layer thickness of the build above the upper surface of the build window 110.

Once the build and build platform 102 are at the correct height, the system 100 can, in response to detecting temperatures proximal the target temperatures in each region of the system 100, selectively photocure a second volume of the resin between the bottom surface of the layer features of the previous photocured layer and the upper surface of the build window 110 corresponding to a second cross-section of the build (i.e. a second layer of the build). Thus, the system 100 can, for a second build cycle succeeding a first build cycle, in response to the resin reservoir exhibiting a temperature proximal the target bulk resin temperature, in response to the gaseous environment exhibiting a temperature proximal the target chamber temperature, and in response to the interface layer exhibiting a temperature proximal the target reaction temperature: at the resin interface, selectively photocure a second volume of the resin reservoir to form a second layer of the build adhered to the first layer of the build; and retract the build platform 102 away from the build window 110.

The system 100 can repeat this process to photocure successive layers of the build in the additive manufacturing process eventually resulting in a finished build.

5.3 Temperature Selection

Generally, prior to executing Blocks of the method S100, the system 100 can access, select, or calculate target temperatures for each region within the system 100 based on the selected resin with which the build is to be manufactured. More specifically, the system 100 can: select a target bulk resin temperature less than the heat deflection temperature of the resin in a photocured state and corresponding toward a target viscosity of the resin in a liquid state; select a target chamber temperature less than the heat deflection temperature of the resin; and select a target reaction temperature greater than the target bulk resin temperature and corresponding toward a target crosslinking density of the resin in the photocured state. Thus, the system 100 can heat each region of the system 100 to temperatures tailored to the specific resin being photocured in the manufacturing process.

In one implementation, the system 100 can access a database of pre-characterized temperature data (e.g., a temperature-viscosity curve, a reaction temperature versus crosslinking density curve) for the resin and can select values for the target bulk resin temperature and the target reaction temperature corresponding toward the target viscosity and the target crosslinking density respectively. Thus, the system 100 can receive an input from a user of the system 100 selecting a resin and, in response, can access the target bulk resin temperature and the target reaction temperature corresponding to the resin selected.

In another implementation, the system 100 can automatically select values of for the target bulk resin temperature and the target reaction temperature based on other pre-characterized properties of the resin. For example, the system 100 can identify known chemical and/or physical characteristics of the resin and select the target bulk resin temperature and the target reaction temperature based on these pre-characterized chemical and physical properties. Thus, in the absence of pre-characterized temperature data for the resin, the system 100 can select values for the target temperatures that result in target properties of the photocured resin.

5.3.1 Target Bulk Resin Temperature

Generally, the system 100 can access a target bulk resin temperature less than the heat deflection temperature of the resin in a photocured state, in order to prevent deformation of the newly cured build during the manufacturing process while part or all of the build is submerged in the resin bath, and corresponding (e.g., via a temperature-viscosity curve) toward a target viscosity of the resin in a liquid state (e.g., less than 20,000 centipoise). In one example, the system 100 sets a target viscosity that is less than 20,000 centipoise and greater than 10 centipoise.

For applications in which the resin, in a liquid state, exhibits viscosities higher than the target viscosity for all temperatures less than the heat deflection temperature of the resin in the photocured state, or for applications in which a user desires to minimize the viscosity of the resin in the liquid state (e.g., in order to increase print speed), the system 100 can select a target bulk resin temperature that minimizes the viscosity of the resin while maintaining a temperature buffer relative to the heat deflection temperature of the resin in the photocured state. In this implementation, the system 100 can select a temperature buffer greater than typical measured temperature variation of the bulk resin temperature during operation of the system 100. For example, if the system 100 can maintain the resin temperature to within two degrees Celsius, then the system 100 can set the temperature buffer at two degrees Celsius and can, therefore, select a target bulk resin temperature two degrees less than the heat deflection temperature of the resin in the photocured state. Thus, the system 100 can minimize the viscosity of the resin while preventing the bulk resin temperature from exceeding the heat deflection temperature of the resin in the photocured state.

The system 100 can select a target bulk resin temperature that enables high-resolution (e.g., "pixel-level") temperature control at the resin interface. For example, the system 100 can heat the resin reservoir toward a target bulk temperature (e.g., up to 110° C.) just below the target reaction temperature at the resin interface but less than the heat deflection temperature of the resin in a photocured state, thereby enabling the system 100, via the interface heat source, to reactively adjust the temperature at the resin interface via small thermal inputs at the resin interface.

In one implementation, the system 100 can automatically detect characteristics of the resin (such as the viscosity of the resin) and adjust the target bulk resin temperature according to the characteristics of the resin. For example, the system 100 can increase the bulk resin temperature until the system 100 detects that the viscosity of the resin is below a threshold viscosity.

5.3.2 Target Reaction Temperature

Generally, the system 100 can access a target reaction temperature greater than the bulk resin temperature and corresponding (e.g., based on a reaction temperature to crosslinking density curve characterizing the photocuring reaction of the resin) toward a target cross-linking density of the resin in the photocured state. Thus, by elevating the interface temperature in the resin reservoir to a temperature proximal the target reaction temperature, the system 100 can increase the cross-linking density of the resulting photocured resin for a given exposure time and intensity, thereby increasing the green strength of the build, reducing requirements for post-curing the build subsequent to the manufacturing process, and/or increasing manufacturing speed of the build.

The system 100 can access or select a target reaction temperature for the resin interface corresponding to the chemical composition and physical properties of the resin. In one implementation, the system 100 can set the target reaction temperature of the resin at a temperature just below the maximum stable temperature of the resin as governed by the minimum boiling point (given the pressure within the build chamber 130) of the components of the resin, thereby minimizing the viscosity of the resin in the interface layer and maximizing the crosslinking density that occurs during the photocuring reaction. In one implementation, the system 100 accesses a target reaction temperature that is calculated based on the minimum boiling temperature of the components of the resin. Alternatively, the system 100 can access a target reaction temperature of the resin that is calculated based on a vapor pressure curve of volatile components of the resin or an evaporation rate curve of the volatile components of the resin by selecting the target reaction temperature corresponding to a maximum allowable value of the vapor pressure or evaporation rate of each component. In one example, the system 100 can set the target reaction temperature based on a manufacturer recommendation for the maximum stable temperature of the resin. In another example, the system 100 can set the target reaction temperature based on empirical studies on the achievable dimensional accuracy of builds corresponding to various reaction temperatures.

In one implementation, the system 100 can access a target reaction temperature greater than the heat deflection temperature of the resin in the photocured state in order to achieve the desired crosslinking density during the photocuring reaction.

In another implementation, the system 100 can access a target reaction temperature calculated based on the target bulk resin temperature and the heat transfer properties of the resin (in both liquid and photocured states) by estimating the distance from the build window 110 for which the temperature of the resin exceeds the heat deflection temperature of the resin in the photocured state. For example, the system 100 can select a target bulk resin temperature and target reaction temperature such that the system 100 can heat the interface layer of the resin reservoir to a temperature proximal the target reaction temperature while maintaining the temperature of prior layers of the build below the heat deflection temperature of the resin in the photocured state.

5.3.3 Target Chamber Temperature

Generally, the system 100 can access or select a target chamber temperature that prevents excessive heat transfer from the surface of the resin reservoir to the gaseous environment in the build chamber 130, thereby preventing reduction of the bulk resin temperature away from the target bulk resin temperature, while also preventing excessive heating of the bulk resin temperature of the resin reservoir due to thermal output energy of the photocuring reaction and the heating of the interface layer of resin at the resin interface.

In one implementation, the system 100 can access a pre-characterized target chamber temperature that is calibrated to a corresponding target bulk resin temperature such that heat transfer between resin reservoir and the gaseous environment of the build chamber 130 remains within an acceptable range for the duration of the manufacturing process.

In another implementation, the system 100 can automatically adjust the target chamber temperature based on a current bulk resin temperature and the target bulk resin temperature based on a thermodynamic model described below. Thus, the system 100 can utilize the gaseous environment of the build chamber 130 in order to effect the bulk resin temperature of the resin reservoir.

5.4 Temperature Controls

Generally, in Blocks S110, S120, and S130 the system 100 controls the bulk temperature of the resin reservoir via the resin temperature control subsystem, the chamber temperature of the build chamber 130 via the chamber temperature control subsystem, and the interface temperature of the interface layer of the resin via the interface temperature control subsystem in order to maintain each of these temperatures proximal a target bulk resin temperature, a target chamber temperature, and a target reaction temperature, respectively. In addition to regulating the chamber temperature within the build chamber 130, the system 100 can also pressurize the build chamber 130 in order to maintain a target chamber pressure within the build chamber 130, thereby preventing off-gassing of volatile compounds from the resin reservoir.

5.4.1 Resin Reservoir Temperature Control

Generally, in Block S110, the system 100 heats the resin reservoir toward a target bulk resin temperature via the resin temperature control subsystem. More specifically, the system 100 can, at a build tray 140 arranged over a build window 110 and containing a resin reservoir of a resin, heat the resin reservoir toward a target bulk resin temperature less than a heat deflection temperature of the resin in a photocured state, the target bulk resin temperature corresponding toward a target viscosity of the resin in a liquid state. Thus, the system 100 can: detect the bulk resin temperature of the resin reservoir; and based on the bulk resin temperature of the resin reservoir, activate or deactivate heating or cooling elements of the resin temperature control subsystem to maintain the bulk resin temperature of the resin reservoir proximal the target bulk resin temperature.

In one implementation, shown in FIG. 4, the system 100 executes closed-loop controls (e.g., proportional-integral-derivative, hereinafter "PID," controls) to increase and/or decrease the thermal output of the resin temperature control subsystem in order to maintain a bulk resin temperature proximal the target bulk resin temperature in the resin reservoir based on a temperature detected via sensors of the resin temperature control subsystem. More specifically, the system 100 can heat the resin reservoir toward the target bulk resin temperature according to a reservoir closed-loop control function. In this implementation, the system 100 can include a PID control function tuned to the build tray 140 and resin reservoir to minimize overshoot and delay. Thus, the system 100 can control the bulk resin temperature of the resin reservoir independent from thermal inputs and outputs to the resin reservoir (e.g., from heating of the interface layer of resin, thermal output due to photocuring layers of the build, and/or due to convective, conductive, or radiative heat transfer into and out of the resin reservoir). In another implementation, the system 100 can detect the bulk resin temperature of the resin reservoir via a chamber-mounted thermal image sensor 160 configured such that the field of view of the chamber-mounted thermal image sensor 160 is incident with the surface of the resin reservoir. In this implementation, the system 100 can average the temperature of a predetermined area of images generated by the chamber-mounted thermal image sensor 160 corresponding to the surface of the resin reservoir and calculate the bulk resin temperature based on this averaged surface temperature (e.g., via extrapolation or a thermodynamic model). Alternatively, the system 100 can execute computer vision techniques to identify regions of the field of view of the chamber-mounted thermal image sensor 160 that correspond to the surface of the resin reservoir, as opposed to the build tray 140, the build platform 102, the partially manufactured build, or any other surface within the build chamber 130 of the system 100.

5.4.2 Build Chamber Temperature Control

Generally, in Block S120, the system 100 can heat the gaseous environment within the build chamber 130 via the chamber temperature control subsystem in order to further insulate and stabilize the bulk resin temperature of the resin reservoir. More specifically, the system 100 can, at the build chamber 130 containing a gaseous environment and encompassing the build tray 140 and the build window 110, heat the gaseous environment toward a target chamber temperature less than a heat deflection temperature of the resin in the photocured state. Thus, the system 100 can: detect the chamber temperature of the gaseous environment of the build chamber 130; and based on the detected temperature, activate or deactivate heating or cooling elements of the chamber temperature control subsystem to maintain the chamber temperature proximal the target chamber temperature.

Figure 4:
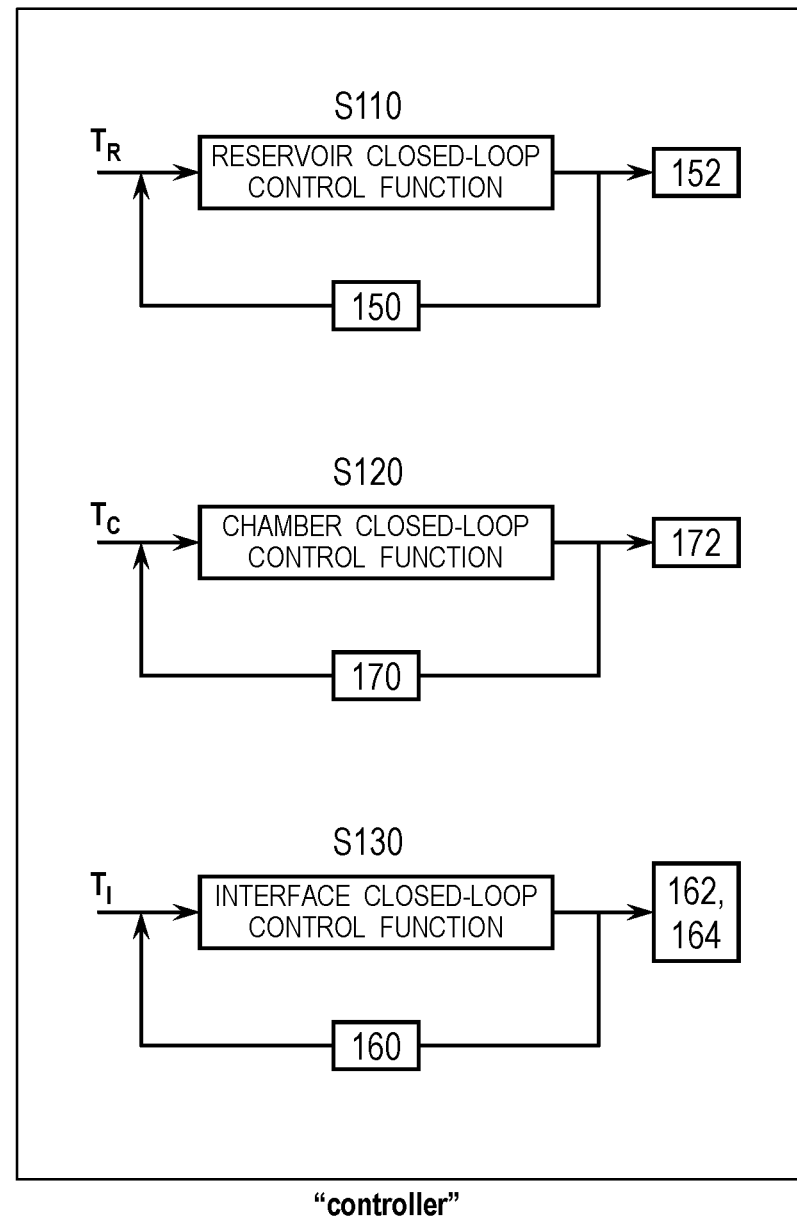
FIG. 4 is a flowchart representation of one variation of the method.

In one implementation, shown in FIG. 4, the system 100 executes closed-loop controls (e.g., PID controls) to increase and/or decrease the thermal output of the chamber temperature control subsystem in order to maintain the target chamber temperature in the gaseous environment of the build chamber 130 based on sensor of the chamber temperature control subsystem. More specifically, the system 100 can, at the build chamber 130, heat the gaseous environment toward the target chamber temperature according to a chamber closed-loop control function. Thus, the system 100 can maintain the target chamber temperature despite from thermal input from the higher temperature resin reservoir and thermal loss via conduction and convection of the gaseous environment with the sides of the build chamber 130. In this implementation, the system 100 can include a chamber closed-loop control function in tuned to minimize overshoot and delay when adjusting the chamber temperature of the gaseous environment of the build chamber 130.

The system 100 can also pressurize the build chamber 130 to increase the boiling temperature of the components in the resin to a boiling temperature above the bulk temperature of the resin, thereby ensuring that the composition of the resin does not change during the additive manufacturing (e.g., due to off-gassing of the more volatile components of the resin). More specifically, the system 100 can pressurize the build chamber 130 toward a target chamber pressure predicted to prevent off-gassing of the resin in the resin reservoir. Furthermore, the system 100 can pressurize the build chamber 130 with an inert gas to reduce the probability of any chemical reactions between air and the heated resin in the resin reservoir. Thus, by pressurizing the build chamber 130, the system 100 mitigates unintended chemical changes to the composition of the resin due to heating the resin.

5.4.3 Resin Interface Temperature Controls

Generally, in Blocks S130, the system 100 heats an interface layer of the resin reservoir toward the target reaction temperature via the interface temperature control subsystem in order to increase the crosslinking density, and therefore the green strength, of the photocured resin upon selective photocuring of a subsequent layer of the build. More specifically, the system 100 can: detect the temperature or temperature distribution at the resin interface; and based on this temperature distribution, activate the heating elements of the interface temperature control subsystem in order to effect a target temperature distribution at the interface layer of the resin reservoir (e.g., a uniform distribution at target reaction temperature, selective regions of the resin interface at the target reaction temperature).

As shown in FIG. 4, the system 100 can execute a closed-loop control algorithm based on a temperature distribution detected by the thermal image sensor 160 positioned below the build window 110 in order to raise the temperature of the interface layer of the resin at the resin interface of the build window 110 toward the target reaction temperature via an interface heat source. Additionally, the system 100 can, by uniformly or selectively heating the build window 110, reduce the magnitude of temperature gradients across the resin interface in order to reduce bulk resin flow across the resin interface and/or reduce deviations in photocuring time or green strength over different regions of a build. In order to increase the temperature of the interface layer of the resin at the resin interface above the elevated bulk temperature of the resin in resin reservoir, the system 100 can: detect the average temperature of the resin across the resin interface (e.g., via the thermal image sensor 160) and apply energy to the resin interface uniformly across the build window 110 such that the average temperature at the resin interface reaches the target temperature. Alternatively, the system 100 can detect regions of the resin interface characterized by temperatures less than the target temperature (e.g., via the thermal image sensor 160) and selectively apply energy to the detected regions in order to increase the temperature of the resin at the resin interface toward the target temperature.

In either of the above implementations, the system 100 first monitors a temperature distribution across the build window 110. The system 100 can record a thermal image utilizing the thermal image sensor 160 arranged beneath the build window 110. The system 100 can then interpret the recorded thermal image to estimate the temperature distribution of the interface layer of the resin at the resin interface based on the thermal image to correct for absorption and/or emission of infrared radiation from the build window 110. The system 100 can record the temperature distribution of the resin at the resin interface as a two-dimensional matrix indicating the estimated temperature of the resin at each pixel across the build window 110. In one implementation, the system 100 can interpolate or extrapolate the temperature distribution (i.e. up-sample or down-sample) such that the size of the two-dimensional matrix aligns with the pixel resolution of the projection subsystem 120 and/or the IR projector 164. Therefore, the system 100 can direct energy to the resin interface on a pixel-by-pixel basis.

Upon detecting the average temperature of the resin interface, the system 100 can: calculate an amount of heat energy predicted to increase the interface temperature of the resin at the resin interface toward the target reaction temperature; and uniformly apply the calculated amount of energy to the build window 110, thereby increasing the temperature of the resin at the resin interface relative to the bulk temperature of the resin reservoir.

Generally, when calculating an input energy necessary to heat the resin at the resin interface toward the target temperature, the system 100 can utilize a physical model and or closed-loop/feedback control algorithm. In one implementation, the system 100 executes tuned PID control at the controller to adjust the intensity of energy continuously during the additive manufacturing process. Alternatively, the system 100 can calculate via a physical model of the resin interface a power and duration of the uniform heat source that, when applied to the resin interface, increases the temperature of the resin toward the target temperature at the time the system 100 photocures the subsequent layer of the build being manufactured.

In one implementation, the system 100 illuminates the build window 110 and/or the resin interface with a uniform infrared lamp in order to uniformly distribute heat across the resin interface. Additionally, the system 100 can adjust the intensity, duration, and/or frequency of the infrared lamp in order to vary the input energy incident upon the resin interface, thereby preventing overshoot according to the aforementioned calculated input energy.

Alternatively, the system 100 can uniformly heat the resin interface via a conductive transparent thin film arranged across the build window 110. In this implementation, the system 100 applies a current that dissipates the calculated input energy to the build window 110 (e.g., accounting for electrical losses, and heat lost to the build window 110). In yet another implementation, the system 100 can apply a current through a set of resistive heating elements that are arranged around the perimeter of the build window 110 and are configured to heat the build window 110.

Generally, in Blocks S132, S134, and S136, the system 100 can: detect a temperature distribution of the interface layer of the resin at the resin interface; calculate a corresponding infrared light projection that, when projected across the build window 110 by an infrared light source, drives a temperature of resin at the resin interface of the build window 110 proximal the target temperature; and project this infrared light projection toward the build window 110. More specifically, the system 100 can: at a resin interface between a surface of the build window 110 and the resin reservoir, detecting a temperature distribution across an interface layer of the resin reservoir via a thermal image sensor 160 arranged below the build window 110 and defining a field of view encompassing the resin interface; calculating an IR light projection predicted to heat the interface layer to a uniform temperature proximal a target reaction temperature across the resin interface, the target reaction temperature corresponding toward a target crosslinking density of the resin in the photocured state; and projecting the IR light projection toward the build window 110. Thus, the system 100 can: identify regions of the resin interface that are characterized by a relatively low temperature when compared toward the target reaction temperature; and selectively project IR light incident to the identified regions, thereby increasing the temperature of the identified regions toward the target temperature for the resin at the resin interface and/or smoothing temperature gradients between lower temperature and higher temperature regions at the resin interface. The system 100 can execute these Blocks of the method S100 before each build cycle, such that the system 100 is continuously monitoring the temperature at the resin interface and applying heat (in the form of an IR projection) to the resin interface in order to raise the temperature of the resin at the resin interface.

The system 100 can project a distribution of IR light that is an inverse of the temperature distribution across the resin interface in order to heat low temperature regions of the resin interface and to smooth out temperature gradients across the IR interface. However, in one implementation, the system 100 can include a digital IR projector 164 that is configured to selectively apply infrared light to the resin interface on a per-pixel basis. Therefore, the system 100 can execute a control algorithm to set the target temperature at each pixel across the resin interface. Alternatively, the system 100 can execute a physical model predicting heat transfer across the resin interface due to the incident IR light from the projector and modulate the incident IR light according to the physical model in order to prevent regional overshoot of the target temperature.

In some implementations of the system 100, the system 100 can selectively heat the resin interface to effect a particular (non-uniform temperature distribution) at the resin interface based on the geometry of successive layers of the build. Thus, the system 100 can: access the geometry of a successive layer of the build; calculate target temperature distribution based on the geometry of the successive layer of the build; calculate an IR light projection predicted to effect the target temperature distribution.

In one example, the system 100 can selectively heat the resin interface to effect a target temperature distribution such that regions of the resin interface coinciding with the geometry of the successive layer of the build are elevated toward the target reaction temperature while regions not coinciding with the successive layers of the build are maintained at a lower temperature. Thus, in this example, the system 100 can reduce the prevalence of reactions occurring outside of the intended regions of the resin interface, thereby improving dimensional accuracy of the build.

In another example, the system can selectively heat the resin interface to effect a target temperature distribution such that the highest temperature in the interface temperature distribution coincides with an edge of the geometry of the successive layer of the build and decreases toward the interior of the cross-sectional region corresponding to the successive layer of the build. Thus, in this example, the system 100 can reduce over-curing that may occur towards the center of a build due to the low resin mobility in these regions of the resin interface and/or the excessively high temperatures, which may occur during the photocuring reaction within builds with large cross-sectional areas.

In one implementation, the physical model predicts the amount of incident energy on a per-pixel basis that results in the target temperature at a future photocuring time at which the system 100 will execute Blocks S140 or S150, thereby accounting for heat transfer effects that may occur within the resin between the time the system 100 projects IR light toward the resin interface and when the system 100 photocures a subsequent layer of the build. In another implementation, the system 100 performs Blocks S140 or S150 in response to detecting, based on a current temperature distribution, that the resin exhibits the target reaction temperature across the resin interface.

6. Global System Controls

Figure 5:
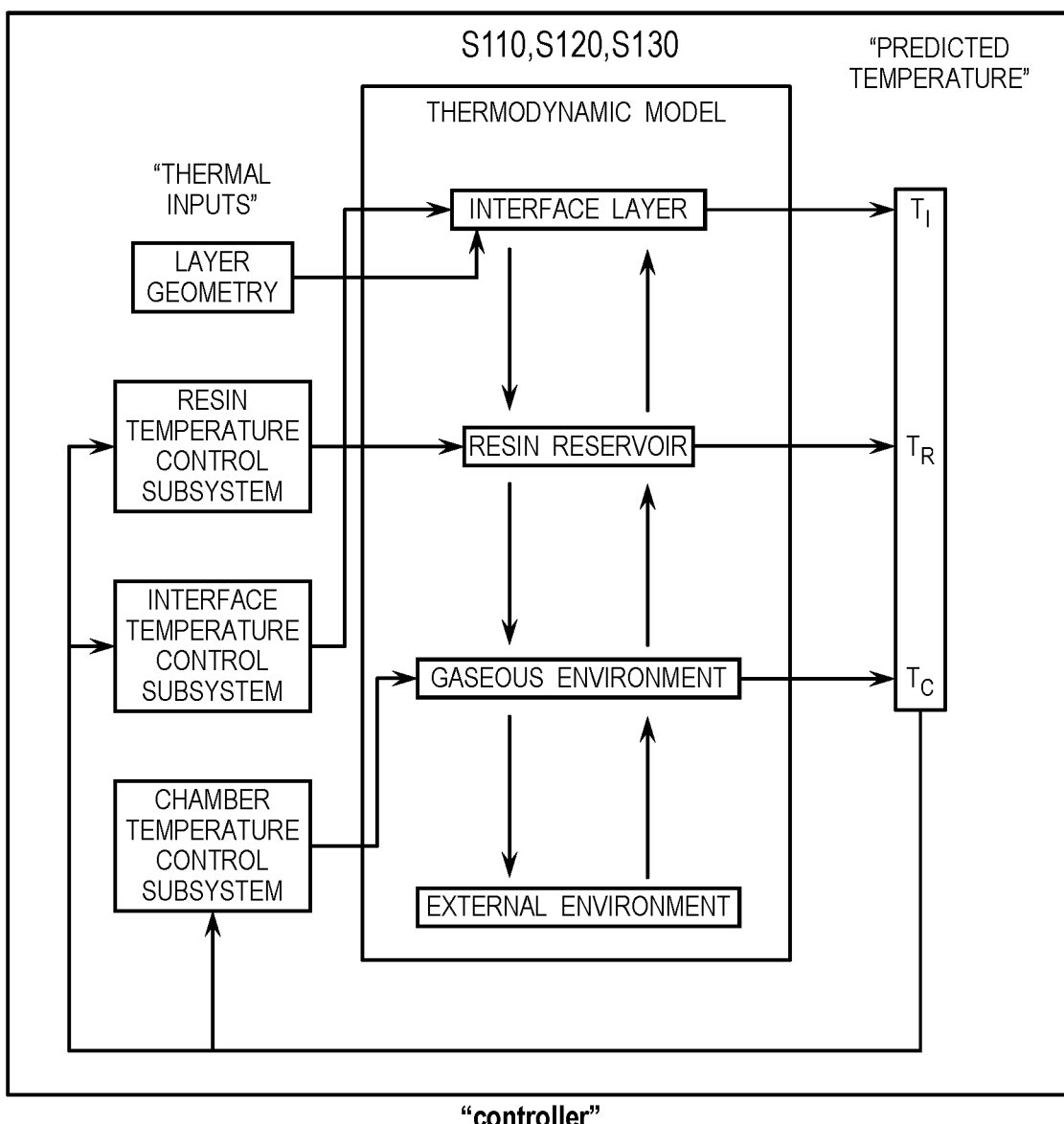
FIG. 5 is a flowchart representation of one variation of the method

In one variation, as shown in FIG. 5, the system 100 can integrate temperature data detected by multiple subsystems (i.e. the resin temperature control subsystem, the interface temperature control subsystem, and the chamber temperature control subsystem) to reduce temperature overshoot by the resin temperature control subsystem, the interface temperature control subsystem, or the chamber temperature control subsystem. More specifically, the system 100 can: execute look-ahead controls based on the geometry of the build being manufactured and the chemistry of the photocuring reaction for the liquid; control the bulk temperature of the resin based on the detected temperature distribution at the resin interface; and/or control the layer progression speed (i.e. print speed) of the additive manufacturing process. Thus, the system 100 can collect temperature distribution data from the thermal image sensor 160 and, in addition to executing resin interface controls, can control other aspects of the system 100 to accurately maintain the target temperature at the resin interface.

The system 100 can maintain a thermodynamic model of the system 100 in order to predict the bulk temperature of the resin reservoir, the interface temperature of the interface layer, and the chamber temperature of the build chamber 130 based on the thermodynamic properties of the system 100 and the resin. For example, the thermodynamic model can include geometries, masses, densities, specific heats, thermal conductivities, heat transfer coefficients, and/or any other characteristics of the objects within the system 100 (including the resin itself and/or any photocured resin in the previously photocured layers of the build) to estimate the heat flux between the system 100 and the external environment and adjust the energy input to the system 100 by the resin temperature control subsystem, the interface temperature control subsystem, the chamber temperature control subsystem, and by the exothermal photocuring reaction. The thermodynamic model can include a mathematical simulation, a numerical model, and/or a more complex simulation such as the finite element method (herein after "FEM").

In one implementation, the system 100 can detect whether the average interface temperature at the resin interface is either significantly below the target reaction temperature and/or significantly above the target reaction temperature (i.e. outside of a predetermined interval) for the resin at the resin interface and direct the resin temperature control subsystem to adjust the bulk resin temperature of the resin accordingly to decrease the response time of the interface layer to thermal input by the system 100. For example, if the average temperature at the resin interface is above a threshold temperature (e.g., above the target reaction temperature or 102% of the target reaction temperature) the system 100 can cool the bulk resin temperature (i.e. lower the target bulk resin temperature) of the resin reservoir via the resin temperature control subsystem to increase heat transfer away from the resin interface. Alternatively, the system 100 can increase the bulk resin temperature (i.e. increase the target bulk resin temperature) of the resin reservoir in response to an average interface temperature at the resin interface lower than the target temperature. Thus, the system 100 can adjust the target bulk resin temperature of the resin reservoir in order to aid the system 100 in controlling the interface temperature at the resin interface.

In any of the above implementations, the system 100 can limit the bulk resin temperature of the resin reservoir to within a particular bulk resin temperature range (e.g., with a minimum and a maximum bulk resin temperature) in order to prevent the over cooling or over heating of the previously photocured layers of the build relative to newly photocured layers of the build.

7. Look-Ahead Controls

In one implementation, the system 100 can implement look-ahead controls by accessing the computer-aided design file for the build being manufactured. The system 100 can then determine the geometry of successive layers of the build that have not yet been photocured by the system 100. Because the photocuring reaction is exothermic, the volume of resin that is cured by the system 100 in steps S140 and S150 contributes significantly to the interface temperature and the interface temperature profile at the resin interface. Therefore, the system 100 can account for the thermal input to the resin reservoir and the interface layer due to the photocuring process when determining an interface distribution or a quantity of energy to direct toward the resin interface.

In order to execute look-ahead controls, the system 100 stores characteristics of the photocuring reaction of the resin such as the energy released per unit volume of the reaction. Thus, the system 100 can relate the volume of resin being photocured in a subsequent layer to the amount of energy to be released in the photocuring reaction. Furthermore, because the system 100 stores a three-dimensional model of the build being manufactured, the system 100 can also identify the distribution of the energy released by the photocuring reaction.

Furthermore, the system 100 can predict (e.g., via a thermodynamic model of the system 100) an interface temperature distribution across the resin interface based on, the current interface temperature distribution across the resin interface, the stored characteristics of the photocuring reaction, and the geometry of subsequent layers of the build. More specifically, the system 100 can access a layer geometry for a build cycle; and calculate an IR light projection predicted to heat the interface layer to the uniform temperature proximal the target reaction temperature across the resin interface coincident with the layer geometry.

In one implementation, upon predicting a future interface temperature distribution across the resin interface, the system 100 can preemptively (e.g., before a region of the resin interface has reached the target interface temperature) reduce the IR light incident to a region of the resin interface coincident with a subsequent layer of the build if the system 100 predicts that the interface temperature of the region will exceed a threshold maximum interface temperature upon photocuring the subsequent layer. More specifically, the system 100 can: access a layer geometry for a build cycle; calculate an exothermal heat output corresponding to photocuring the layer geometry; and adjust the thermodynamic model based on the exothermal heat output.

In another implementation, the system 100 can adjust the target bulk resin temperature of the resin reservoir based on a predicted amount of heat added to the resin reservoir over successive photocuring steps and a thermodynamic model of the system 100. Likewise, the system 100 can adjust the target chamber temperature, based on the thermodynamic model of the system 100, in order to effect a change in the bulk resin temperature of the resin reservoir. More specifically, the system 100 can: heat the resin reservoir toward the target bulk resin temperature according to a thermodynamic model of the build window 110, the resin reservoir, the build tray 140, the gaseous environment, and the build chamber 130; heat the gaseous environment toward the target chamber temperature according to the thermodynamic model; and heat the interface layer toward the target reaction temperature according to the thermodynamic model.

In particular, in this implementation, the system 100 can adjust the thermodynamic model by: reducing thermal input to the resin reservoir based on the first exothermal heat output; and reducing thermal input to the gaseous environment based on the first exothermal heat output. Thus, the system 100 can prevent overheating of the resin at the resin interface or within the resin reservoir by accounting for the heat transfer between regions of the system 100 and a predicted thermal input to the system 100 via the photocuring reaction of each successive layer of the build.

8. Print Speed Adjustment

In one implementation, the system 100 can adjust the rate at which the system 100 executes photocuring Blocks S140 and S150 in order to prevent the interface temperature of the resin at the resin interface from exceeding a threshold maximum interface temperature (e.g., greater than the target reaction temperature). Upon predicting that the interface temperature at the resin interface or the bulk resin temperature of the resin reservoir will exceed a threshold maximum temperature, the system 100 can increase the time until the system 100 photocures a subsequent layer of the build. More specifically, the system 100 can: calculate a build cycle delay based on a predicted exothermal heat output due to photocuring a first layer of the build; and initiate a second build cycles succeeding the first build cycle by the build cycle delay.

The system 100 can also adjust the intensity and/or duration of the UV light exposure in Blocks S140 and S150 in order to spread the energy of the photocuring reaction over a longer period of time, thereby preventing the interface temperature at the resin interface from exceeding a threshold maximum interface temperature.

9. Infrared Post-Curing

In one implementation, the system 100 can post-cure the build on a layer-by-layer basis by exposing each successive, newly photocured layer to projected IR light from the IR projector 164 in order to heat the newly photocured layer above the reaction temperature in a post-cure phase of the build cycle. More specifically, the system 100 can for a build cycle, post-cure a layer of the build via the IR projector 164. Thus, the system 100 can further reduce the difference between the green properties of the build and the final target properties of the build and the reduce the need for a post-curing step after removal of the build from the system 100.

In this implementation, the system 100 can access the geometry of the layer of the build and direct IR light, via the IR projector 164, to the regions of the resin interface corresponding to the previous layer of the build, thereby preventing excessive IR radiation incident to the resin interface. Additionally, by selectively projecting the IR light incident with the previous layer of the build, the system 100 can minimize the total thermal energy input to the build, thereby preventing heat deflection of prior layers of the build.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for additive manufacturing comprising:
   selecting a target bulk resin temperature less than a heat deflection temperature of a resin in a photocured state by a set temperature buffer;
   at a reservoir volume of the resin in a liquid state and arranged over a build window, heating the reservoir volume toward the target bulk resin temperature;
   selectively heating regions of an interface layer of the resin to bring a temperature across the interface layer toward a target reaction temperature of the resin, the interface layer of the resin interposed between an upper surface of the build window and a preceding layer of a build, and the target reaction temperature of the resin greater than the target bulk resin temperature; and
   during a build cycle:
      detecting a first temperature of the reservoir volume;
      comparing the first temperature to the target bulk resin temperature;
      detecting a second temperature of the interface layer;
      comparing the second temperature to the target reaction temperature; and
      in response to the first temperature being proximal the target bulk resin temperature and in response to the second temperature being proximal the target reaction temperature, selectively photocuring a volume of the resin in the interface layer through the build window to form a photocured resin layer of the build.

2. The method of claim 1:
   further comprising:
      at a build chamber containing a gaseous environment above the reservoir volume and the build window, heating the gaseous environment toward a target chamber temperature; and
      detecting a third temperature of the gaseous environment and comparing the third temperature to the target chamber temperature; and
   wherein selectively photocuring the volume of the resin in the interface layer to form the photocured resin layer of the build comprises, in response to the first temperature being proximal the target bulk resin temperature, in response to the second temperature being proximal the target reaction temperature, and in response to the third temperature being proximal the target chamber temperature, selectively photocuring the volume of the resin in the interface layer to form the photocured resin layer of the build.

3. The method of claim 2, wherein the target chamber temperature is less than the heat deflection temperature of the resin in the photocured state.

4. The method of claim 1, wherein the target bulk resin temperature corresponds to a target viscosity of the resin in the liquid state.

5. The method of claim 1, wherein the target reaction temperature is greater than the target bulk resin temperature and corresponds to a target crosslinking density of the resin in the photocured state.

6. The method of claim 1:
   further comprising:
      melting a quantity of the resin provided in a solid state into the resin in the liquid state; and
      detecting a phase change of the quantity of the resin from the solid state to the liquid state;
   wherein, at the reservoir volume, heating the reservoir volume toward the target bulk resin temperature comprises, in response to detecting the phase change, heating the reservoir volume toward the target bulk resin temperature; and
   wherein selectively heating regions of the interface layer comprises, in response to detecting the phase change, selectively heating regions of the interface layer of the resin toward the target reaction temperature.

7. The method of claim 6, wherein detecting the phase change of the quantity of the resin from the solid state to the liquid state comprises detecting the phase change of the quantity of the resin from the solid state to the liquid state via a visual light image sensor.

8. The method of claim 1, wherein detecting the second temperature of the interface layer comprises detecting the second temperature of the interface layer via a thermal image sensor arranged below the build window and defining a field of view aligned with the build window.

9. The method of claim 1, wherein selectively heating regions of the interface layer comprises selectively heating regions of the interface layer via an infrared projector defining a projection area aligned with the build window.

10. The method of claim 9:
    further comprising:
       detecting a temperature distribution across the interface layer via a thermal image sensor arranged below the build window and defining a field of view aligned with the build window;
       accessing a first layer geometry for the build cycle;
       calculating a first target temperature distribution based on the first layer geometry; and
       calculating an infrared light projection predicted to heat the interface layer to the first target temperature distribution; and
    wherein selectively heating regions of the interface layer via the infrared projector comprises projecting the infrared light projection toward the interface layer.

11. The method of claim 10, wherein calculating the first target temperature distribution based on the first layer geometry comprises calculating the first target temperature distribution, wherein regions of the interface layer coinciding with the first layer geometry define the target reaction temperature.

12. The method of claim 10, wherein calculating the first target temperature distribution based on the first layer geometry comprises calculating the first target temperature distribution, wherein edges of the first layer geometry define the target reaction temperature.

13. The method of claim 1, further comprising:
    accessing a first layer geometry for the build cycle;
    calculating a replacement volume of the resin based on the first layer geometry approximating the volume of the resin;

at a resin dispenser subsystem, preheating the replacement volume toward a third temperature proximal the target bulk resin temperature; and in response to selectively photocuring the volume of the resin, dispensing the replacement volume into the reservoir volume via the resin dispenser subsystem.

14. The method of claim 1, further comprising detecting the first temperature of the reservoir volume via a thermal image sensor defining a field of view incident a surface of the reservoir volume.

15. The method of claim 1, further comprising post-curing the photocured resin layer of the build via an infrared projector defining a projection area aligned with the build window.

16. A method for additive manufacturing comprising:
at a build chamber containing a gaseous environment above a reservoir volume of a resin in a liquid state, heating the gaseous environment toward a target chamber temperature less than a heat deflection temperature of the resin in a photocured state;

selectively heating regions of an interface layer of the resin to bring a temperature across the interface layer toward a target reaction temperature of the resin, the interface layer of the resin interposed between an upper surface of the build window and a preceding layer of a build, and the target reaction temperature of the resin greater than the target chamber temperature and different from the heat deflection temperature of the resin in the photocured state; and during a build cycle:
detecting a first temperature of the gaseous environment;
comparing the first temperature to the target chamber temperature;
detecting a second temperature of the interface layer;
comparing the second temperature to the target reaction temperature; and
in response to the first temperature being proximal the target chamber temperature and in response to the second temperature being proximal the target reaction temperature, selectively photocuring a volume of the resin through the build window to form a photocured resin layer of the build.

17. The method of claim 16, wherein the target reaction temperature corresponds to a target crosslinking density of the resin in the photocured state.

18. The method of claim 16, further comprising pressurizing the build chamber toward a target chamber pressure predicted to prevent off-gassing of the resin in the reservoir volume.

19. A method for additive manufacturing comprising:
at a reservoir volume of a resin in a liquid state and arranged over a build window, heating the reservoir volume toward a target bulk resin temperature less than a heat deflection temperature of the resin in a photocured state by a set temperature buffer;

selectively heating regions of an interface layer of the resin to bring a temperature across the interface layer toward a target reaction temperature of the resin, the interface layer of the resin interposed between an upper surface of the build window and a preceding layer of a build, and the target reaction temperature of the resin greater than the target bulk resin temperature; and during a build cycle:
detecting when a first temperature of the reservoir volume is proximal to the target bulk resin temperature;
detecting when a second temperature across the interface layer is proximal to the target reaction temperature; and
in response to detecting the first temperature as being proximal to the target bulk resin temperature and in response to detecting the second temperature as being proximal to the target reaction temperature, selectively photocuring a volume of the resin through the build window to form a photocured resin layer of the build.

20. The method of claim 19, wherein the target bulk resin temperature corresponds to a target viscosity of the resin in the liquid state.

* * * * *